United States Patent
Gilbert et al.

(10) Patent No.: US 12,012,107 B2
(45) Date of Patent: Jun. 18, 2024

(54) OPERATOR MONITORING AND ENGAGEMENT

(71) Applicant: University of Florida Research Foundation, Incorporated, Gainesville, FL (US)

(72) Inventors: Juan Eugene Gilbert, Gainesville, FL (US); Jerone N. Dunbar, Dublin, OH (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 474 days.

(21) Appl. No.: 16/841,891

(22) Filed: Apr. 7, 2020

(65) Prior Publication Data
US 2020/0353933 A1    Nov. 12, 2020

Related U.S. Application Data (60) Provisional application No. 62/843,643, filed on May 6, 2019.

(51) Int. Cl.
*B60W 30/192*    (2012.01)
*B60W 40/08*    (2012.01)
(Continued)

(52) U.S. Cl.
CPC .......... *B60W 30/192* (2013.01); *B60W 40/08* (2013.01); *B60W 50/14* (2013.01);
(Continued)

(58) Field of Classification Search
CPC .... B60W 30/192; B60W 40/08; B60W 50/14; B60W 2040/0818; B60W 2040/0863;
(Continued)

(56) References Cited

U.S. PATENT DOCUMENTS

| | | | |
|---|---|---|---|
| 8,022,831 B1 | 9/2011 | Wood-Eyre | |
| 2015/0288797 A1* | 10/2015 | Vincent | G16H 10/60 455/404.2 |

(Continued)

FOREIGN PATENT DOCUMENTS

| | | | | |
|---|---|---|---|---|
| DE | 102017212355 A1 * | 1/2019 | | B60W 40/09 |
| KR | 20190036104 A * | 4/2019 | | |

OTHER PUBLICATIONS

Mathemania, "Basic Math Operations", Viewed via The Wayback Machine at: https://web.archive.org/web/20180907122531/http://www.mathemania.com:80/lesson/basic-math-operations/ (Year: 2018).*

(Continued)

*Primary Examiner* — Vivek D Kppikar
*Assistant Examiner* — Farhad Dawodi
(74) *Attorney, Agent, or Firm* — Alston & Bird LLP (57) ABSTRACT

Methods, computing entities, systems, and computer program products for monitoring alertness of an operator of a vehicle are provided. In an example embodiment, a mobile computing entity receives biometric data and behavior data for the operator. The biometric data and behavior data captured by at least one of a wearable sensor, a visual sensor, or a vehicle sensor onboard the vehicle. The mobile computing entity determines an alertness level of the operator based at least in part on the biometric data and the behavior data using a model that is personalized for the operator. Responsive to determining that the alertness level of the operator satisfies a first treatment level threshold, the mobile computing entity initiates an operator engagement interaction to increase the alertness level of the operator.

20 Claims, 5 Drawing Sheets

(51) Int. Cl.
  *B60W 50/14* (2020.01)
  *G06N 5/04* (2023.01)
  *G06N 20/00* (2019.01)
  *G08B 21/06* (2006.01)
(52) U.S. Cl.
  CPC .............. *G06N 5/04* (2013.01); *G06N 20/00* (2019.01); *G08B 21/06* (2013.01); *B60W 2040/0818* (2013.01); *B60W 2540/229* (2020.02)
(58) Field of Classification Search
  CPC ...... B60W 2540/221; B60W 2540/229; B60K 28/066; G06N 5/04; G06N 20/00; G08B 21/06
  See application file for complete search history.

(56) References Cited

U.S. PATENT DOCUMENTS

| | | | |
|---|---|---|---|
| 2016/0096529 A1 | 4/2016 | Davidsson et al. | |
| 2016/0117928 A1* | 4/2016 | Hodges | G06F 3/04842 701/99 |
| 2016/0267335 A1* | 9/2016 | Hampiholi | B60K 28/066 |
| 2017/0080856 A1* | 3/2017 | Enomoto | B60Q 9/00 |
| 2017/0110022 A1* | 4/2017 | Gulash | G09B 5/06 |
| 2017/0267251 A1 | 9/2017 | Roberts et al. | |
| 2017/0355377 A1* | 12/2017 | Vijaya Kumar | B60W 50/0098 |
| 2018/0157980 A1* | 6/2018 | Kochura | G06N 5/048 |
| 2018/0312164 A1* | 11/2018 | Sasabuchi | B60W 30/18018 |
| 2019/0025825 A1* | 1/2019 | Takahama | B60W 50/14 |
| 2019/0129418 A1* | 5/2019 | Swan | A61B 5/162 |
| 2019/0213429 A1* | 7/2019 | Sicconi | G06F 3/012 |
| 2022/0048531 A1* | 2/2022 | De La Taste | B60W 50/0098 |

OTHER PUBLICATIONS

D. Gilbert, How Officers Detect Drugged Drivers, Nov. 1996, National Safety Council. Traffic Safety (Chicago), 96.6, 6-7 (Year: 1996).*

16841891-NPL_How Officers Detect Drugged Drivers by D. Gilbert—National Safety Council Traffic Safety (Chicago) 1996 (Year: 1996).*

Li, Gang et al. *Combined EEG-Gyroscope-tDCS Brain Machine Interface System for Early Management of Driver Drowsiness*, IEEE Transactions on Human-Machine Systems, vol. 48, No. 1, Feb. 2018, pp. 50-62.

Mann, Alexandra. *Trivia App to Keep Drivers Awake by Shouting Questions*, Technology News, Nov. 14, 2011, (3 pages), [online]. [Retrieved from the Internet 1029-01-14)] <http://nocamels.com/2011/11/trivia-app-to-keep-drivers-awake-by-shouting-questions/>.

* cited by examiner

OPERATOR MONITORING AND ENGAGEMENT

CROSS-REFERENCE TO RELATED APPLICATIONS

This application claims priority to U.S. Application No. 62/843,643, filed May 6, 2019, the content of which is hereby incorporated by reference in its entirety.

BACKGROUND

Drowsy and non-alert operation of vehicles is a significant cause of injuries and fatalities. According to the Center for Disease Control and Prevention, upwards of 6,000 U.S. fatalities a year may be due to drowsy driving. Therefore, there is a need in the art for tools for reducing the operation of vehicles by drowsy or non-alert operators.

BRIEF SUMMARY OF SOME EXAMPLE EMBODIMENTS

Various embodiments of the present invention provide methods, apparatus, systems, computer program products, and/or the like for monitoring an operator of a vehicle to determine when the operator is drowsy or non-alert. Various embodiments provide tools for increasing the alertness of the operator of a vehicle when the operator is determined to be drowsy or non-alert. Various embodiments provide tools for aiding a drowsy or non-alert driver to notify one or more contacts, find a place to stop and rest, and/or the like. In various embodiments, the monitoring of the operator comprises monitoring operator behavior (e.g., with regards to the operation of the vehicle, eye motion, body posture, vocal qualities, and/or the like) and/or the monitoring of operator biometrics (e.g., brain wave activity such as alpha and/or theta electrical brain activity, blood pressure, heart rate, pulse, oxygen saturation levels, and/or the like). In various embodiments, the monitoring may include the analysis of operator behavior and/or operator biometrics using a model trained via one or more machine learning techniques to detect drowsiness and/or non/low alertness of an operator. In an example embodiment, the machine learning trained model may be trained to detect drowsiness and/or non/low alertness for a particular operator (e.g., the model be personalized to a particular operator's biometric and/or behavioral patterns).

In various embodiments, when an operator is identified as being drowsy or having a low level of alertness, an operator engagement system is activated. The operator engagement system is configured to increase the operator's alertness. In an example embodiment, the operator engagement system is a voice-based system configured to ask the operator questions and receive the operator's responses to the questions. In an example embodiment, the questions are elementary level arithmetic problems. For example, the questions may be third grade level addition and/or subtraction problems.

In various embodiments, if the operator's alertness is not found to be improved, one or more contacts may be notified and/or a phone call may be initiated between the operator and a contact. In an example embodiment, the contacts may be emergency services, a contact related to the operator's employer (e.g., if the operator is operating the vehicle as part of their employment), a family member or friend, and/or the like. In an example embodiment, the system may be configured to provide the operator with suggestions for places to stop and rest and/or instructions to stop and rest. In an example embodiment, if the operator is determined to be non-responsive, the vehicle may be automatically stopped, parked, and/or the like.

In various embodiments, various actions are performed by a mobile computing entity configured to interface with a vehicle controller. For example, the vehicle may be a car, truck, bus, boat, train, airplane, helicopter, aircraft, human operated machinery and/or equipment, forklift, golf cart, manually operated drone (e.g., a vehicle that is remotely controlled by a human), manned tractor, motorcycle, moped, Segway, bicycle, tractor and trailer combination, van, flatbed truck, vehicle, barge, and/or any other human operated form of object for moving or transporting people and/or items. The mobile computing entity may be in communication with one or more sensors onboard the vehicle configured to monitor operator behavior and/or biometrics. For example, the one or more sensors may include a camera and/or visual sensor. For example, a camera or visual sensor onboard the vehicle and in communication with the mobile computing entity may be configured to capture images and/or video and/or monitor the operator's eyes and/or face to determine where the operator is looking, how often and/or for how long the operator blinks, how often the operator yawns, and/or the like. The one or more sensors may include vehicle sensors configured to monitor the operator's performance in controlling the vehicle (e.g., speed, changes in speed, intensity of braking, lane management, and/or the like). The one or more sensors may include wearable sensors worn by the operator such as brain computer interface (BCI) devices configured to capture electroencephalography (EEG) information/data, a wearable activity tracker (e.g., a Fitbit like device), and/or the like. The sensor information/data captured by the one or more sensors onboard the vehicle may then be used, by the mobile computing entity, to perform monitoring of the operator and identification of when the operator is drowsy and/or non-alert, such that actions may be taken to increase the alertness of the operator.

According to an aspect of the present invention, a method for monitoring alertness of an operator of a vehicle is provided. In an example embodiment, the method comprises receiving, by a processor (e.g., of a mobile computing entity onboard the vehicle) biometric information/data and behavior information/data for the operator. The biometric information/data and behavior information/data is captured by at least one of a wearable sensor, a visual sensor, or a vehicle sensor onboard the vehicle. The method further comprises determining, by the processor, an alertness level of the operator based at least in part on the biometric and behavior information/data using a model that is personalized for the operator; and responsive to determining that the alertness level of the operator satisfies a first treatment level threshold, initiating, by the processor, an operator engagement interaction to increase the alertness level of the operator.

According to another aspect, a mobile computing entity is provided. In an example embodiment, the mobile computing entity comprises at least one processor, a communications interface configured for communicating via at least one network, and at least one memory storing computer program code. The mobile computing entity is onboard a vehicle comprising one or more vehicle sensors in communication with a vehicle controller. The at least one memory and the computer program code are configured to, with the processor, cause the apparatus to at least receive biometric data and behavior data for the operator. The biometric data and behavior data is captured by at least one of a wearable sensor, a visual sensor, or a vehicle sensor onboard the vehicle. The at least one memory and the computer program code are further configured to, with the processor, cause the apparatus to at least determine an alertness level of the operator based at least in part on the biometric data and the behavior data using a model that is personalized for the operator; and responsive to determining that the alertness level of the operator satisfies a first treatment level threshold, initiate an operator engagement interaction to increase the alertness level of the operator.

According to yet another aspect, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to receive biometric data and behavior data for the operator. The biometric data and behavior data is captured by at least one of a wearable sensor, a visual sensor, or a vehicle sensor onboard the vehicle. The computer-readable program code portions further comprise executable portions configured, when executed by a processor of an apparatus, to cause the apparatus to determine an alertness level of the operator based at least in part on the biometric data and the behavior data using a model that is personalized for the operator; and responsive to determining that the alertness level of the operator satisfies a first treatment level threshold, initiate an operator engagement interaction to increase the alertness level of the operator.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Various embodiments of the present invention provide methods, apparatus, systems, computer program products, and/or the like for improving the alertness of a vehicle operator. For example, various embodiments provide methods, apparatus, systems, computer program products, and/or the like for monitoring an operator of a vehicle to determine when the operator is drowsy or non-alert. In various embodiments, the vehicle is a car, truck, bus, boat, train, airplane, helicopter, aircraft, human operated machinery and/or equipment, forklift, golf cart, manually operated drone (e.g., a vehicle that is remotely controlled by a human), manned tractor, motorcycle, moped, Segway, bicycle, tractor and trailer combination, van, flatbed truck, vehicle, barge, and/or any other human operated form of object for moving or transporting people and/or items. Various embodiments provide tools for increasing the alertness of the operator of a vehicle when the operator is determined to be drowsy or non-alert. Various embodiments provide tools for aiding a drowsy or non-alert driver to notify one or more contacts, find a place to stop and rest, and/or the like. In various embodiments, the monitoring of the operator comprises monitoring operator behavior (e.g., with regards to the operation of the vehicle, eye motion, body posture, vocal qualities, and/or the like) and/or the monitoring of operator biometrics (e.g., brain wave activity such as alpha and/or theta electrical brain activity, blood pressure, heart rate, pulse, oxygen saturation levels, and/or the like). In various embodiments, the monitoring may include the analysis of operator behavior and/or operator biometrics using a model trained via one or more machine learning techniques to detect drowsiness and/or non/low alertness of an operator. In an example embodiment, the machine learning trained model may be trained to detect drowsiness and/or non/low alertness for a particular operator (e.g., the model be personalized to a particular operator's biometric and/or behavioral patterns).

In various embodiments, when an operator is identified as being drowsy or having a low level of alertness, an operator engagement system is activated. The operator engagement system is configured to increase the operator's alertness. In an example embodiment, the operator engagement system is a voice-based system configured to ask the operator questions and receive the operator's responses to the questions. In an example embodiment, the questions are elementary level arithmetic problems. For example, the questions may be third grade level addition and/or subtraction problems.

In various embodiments, if the operator's alertness is not found to be improved, one or more contacts may be notified and/or a phone call may be initiated between the operator and a contact. In an example embodiment, the contacts may be emergency services, a contact related to the operator's employer (e.g., if the operator is operating the vehicle as part of their employment), a family member or friend, and/or the like. In an example embodiment, the system may be configured to provide the operator with suggestions for places to stop and rest and/or instructions to stop and rest. In an example embodiment, if the operator is determined to be non-responsive, the vehicle may be automatically stopped, parked, and/or the like.

In various embodiments, various actions are performed by a mobile computing entity configured to interface with a vehicle controller. The mobile computing entity may be in communication with one or more sensors onboard the vehicle configured to monitor operator behavior and/or biometrics. For example, the one or more sensors may include a camera and/or visual sensor. For example, a camera or visual sensor onboard the vehicle and in communication with the mobile computing entity may be configured to capture images and/or video and/or monitor the operator's eyes and/or face to determine where the operator is looking, how often and/or for how long the operator blinks, how often the operator yawns, and/or the like. The one or more sensors may include vehicle sensors configured to monitor the operator's performance in controlling the vehicle (e.g., speed, changes in speed, intensity of braking, lane management, and/or the like). The one or more sensors may include wearable sensors worn by the operator such as brain computer interface (BCI) devices configured to capture electroencephalography (EEG) information/data, a wearable activity tracker (e.g., a Fitbit like device), and/or the like. The sensor information/data captured by the one or more sensors onboard the vehicle may then be used, by the mobile computing entity, to perform monitoring of the operator and identification of when the operator is drowsy and/or non-alert, such that actions may be taken to increase the alertness of the operator.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1:
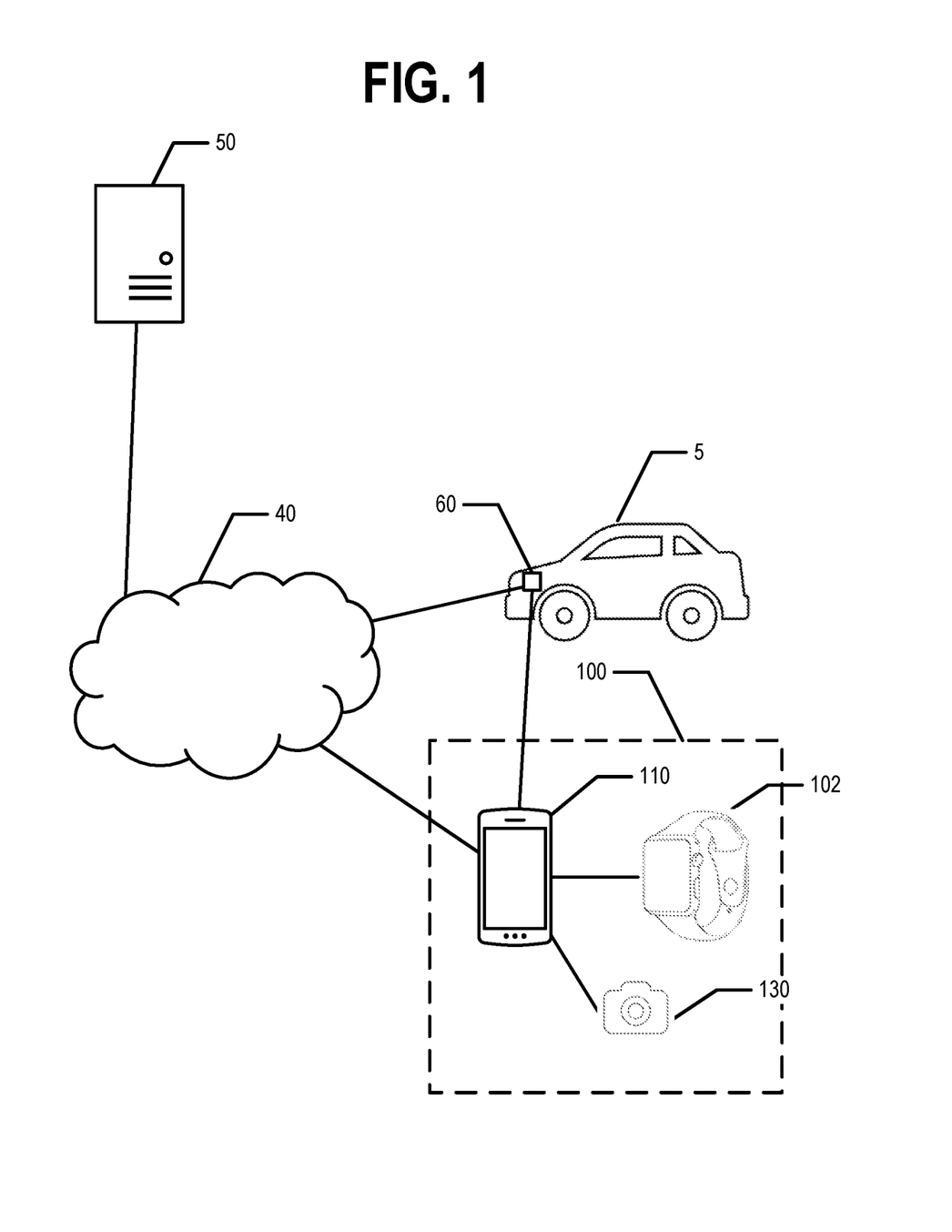
FIG. 1 is an overview of a system that can be used to practice embodiments of the present invention.

FIG. 1 provides an illustration of an exemplary embodiment of the present invention. As shown in FIG. 1, this particular embodiment may include one or more remote computing entities 50, one or more onboard systems 100 of a vehicle 5, a vehicle control/collection device 60 configured to control a vehicle 5, and one or more networks 40. While the vehicle 5 is illustrated as a delivery truck in FIG. 1, in various embodiments, the vehicle 5 may be a car, truck, bus, boat, train, airplane, helicopter, aircraft, human operated machinery and/or equipment, forklift, golf cart, manually operated drone (e.g., a vehicle that is remotely controlled by a human), manned tractor, motorcycle, moped, Segway, bicycle, tractor and trailer combination, van, flatbed truck, vehicle, barge, and/or any other human operated form of object for moving or transporting people and/or items. In various embodiments, an onboard system 100 comprises one or more mobile computing entities 110, one or more wearable sensors 102, one or more cameras and/or visual sensors 130. The mobile computing entity 110 may be in communication with the one or more wearable sensors 102, one or more cameras and/or visual sensors 130, vehicle control/collection device 60, one or more vehicle sensors, and/or the like via wired communication and/or via a short-range communication protocol (e.g., a communication protocol having a range that is appropriate for two components within a vehicle to communicate with one another via the communication protocol). The mobile computing entity 110, vehicle control/collection device 60 and/or remote computing entity 50 may be in direct or indirect communication with, for example, one another over the same or different wired or wireless networks 40. Additionally, while FIG. 1 illustrates the various system entities as separate, standalone entities, the various embodiments are not limited to this particular architecture.

1. Exemplary Vehicle

In various embodiments, the term vehicle 5 is used generically. For example, a vehicle 5 may be a car, truck, bus, boat, train, airplane, helicopter, aircraft, human operated machinery and/or equipment, forklift, golf cart, manually operated drone (e.g., a vehicle that is remotely controlled by a human), manned tractor, motorcycle, moped, Segway, bicycle, tractor and trailer combination, van, flatbed truck, vehicle, barge, and/or any other human operated form of object for moving or transporting people and/or items.

Figure 2:
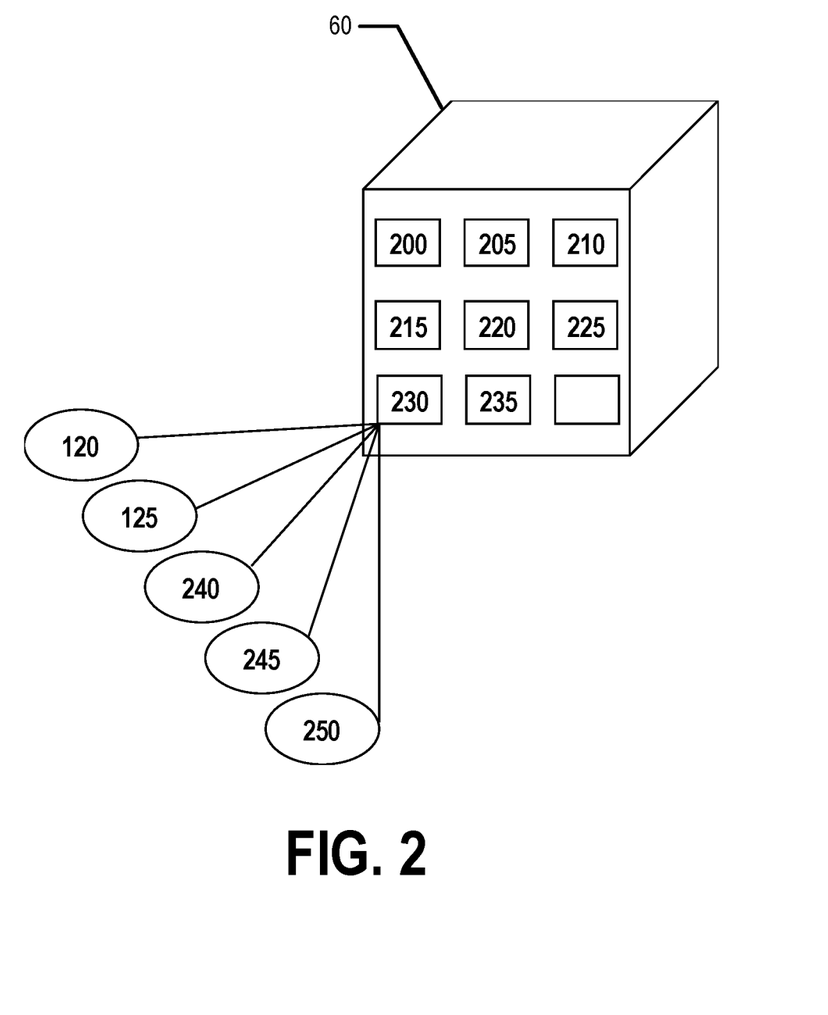
FIG. 2 is an exemplary schematic diagram of a vehicle control/collection device, according to an example embodiment of the present invention.

In one embodiment, the vehicle 5 may include one or more control devices. FIG. 2 provides a block diagram of an exemplary vehicle control/collection device 60 that may be attached, affixed, disposed upon, integrated into, or part of a vehicle 5. The vehicle control/collection device 60 may collect telematics information/data (including location data) and transmit/send the information/data to the mobile computing entity 110, the remote computing entity 50, and/or various other computing entities via one of several communication methods.

In one embodiment, the vehicle control/collection device 60 may include, be associated with, or be in wired or wireless communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the vehicle 5 but external to the vehicle control/collection device 60.

In one embodiment, the one or more location sensors 120, modules, or similar words used herein interchangeably may be one of several components in wired or wireless communication with or available to the vehicle control/collection device 60. Moreover, the one or more location sensors 120 may be compatible with GPS satellites, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 5 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with the remote computing entity 50, the vehicle control/collection device 60, mobile computing entity 110, and/or other computing entities.

As indicated, in addition to the one or more location sensors 120, the vehicle control/collection device 60 may include and/or be associated with one or more telematics sensors 125, modules, and/or similar words used herein interchangeably. For example, the telematics sensors 125 may include vehicle sensors, such as engine, fuel, odometer, hubometer, tire pressure, location, weight, emissions, door, accelerator and/or brake pedal, accelerometer, gyroscope, visual/optical, and/or speed sensors. The telematics information/data may include, but is not limited to, speed data, emissions data, RPM data, tire pressure data, oil pressure data, seat belt usage data, distance data, fuel data, idle data, acceleration data (including deceleration data), lane management data, handling data (e.g., related to how the operator interacts with the steering wheel), and/or the like (e.g., referred to herein as telematics data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological information/data (e.g., referred to herein as telematics data).

In one embodiment, the ECM 245 may be one of several components in communication with and/or available to the vehicle control/collection device 60. The ECM 245, which may be a scalable and subservient device to the vehicle control/collection device 60, may have information/data processing capability to decode and store analog and digital inputs from vehicle systems and sensors. The ECM 245 may further have information/data processing capability to collect and present telematics information/data to the J-Bus (which may allow transmission to the vehicle control/collection device 60), and output standard vehicle diagnostic codes when received from a vehicle's J-Bus-compatible on-board controllers 240 and/or sensors.

As indicated, a communication port 230 may be one of several components available in the vehicle control/collection device 60 (or be in or as a separate computing entity). Embodiments of the communication port 230 may include an Infrared information/data Association (IrDA) communication port, an information/data radio, and/or a serial port. For example, the mobile computing entity 110 may interface with the vehicle control/collection device 60 via a communication port 230. The communication port 230 may receive instructions for the vehicle control/collection device 60. These instructions may be specific to the vehicle 5 in which the vehicle control/collection device 60 is installed, specific to the geographic area in which the vehicle 5 will be traveling, specific to the function the vehicle 5 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra-wideband (UWB), infrared (IR) protocols, Bluetooth protocols (including Bluetooth low energy (BLE)), wireless universal serial bus (USB) protocols, and/or any other wireless protocol.

In various embodiments, the vehicle control/collection device 60 may be configured to control the vehicle 5. For example, the vehicle control/collection device 60 may be an advanced driver assistance system (ADAS) or may be configured to control the vehicle 5 in an automated fashion, at least under particular circumstances. For example, in an example embodiment, the vehicle control/collection device 60 may be capable of operating the vehicle 5 in autopilot mode for at least a short period of time under one or more circumstances. In an example embodiment, the vehicle control/collection device 60 may be capable of moving the vehicle 5 from a travel lane of a road network and parking the vehicle 5.

2. Exemplary Remote Computing Entity

Figure 3:
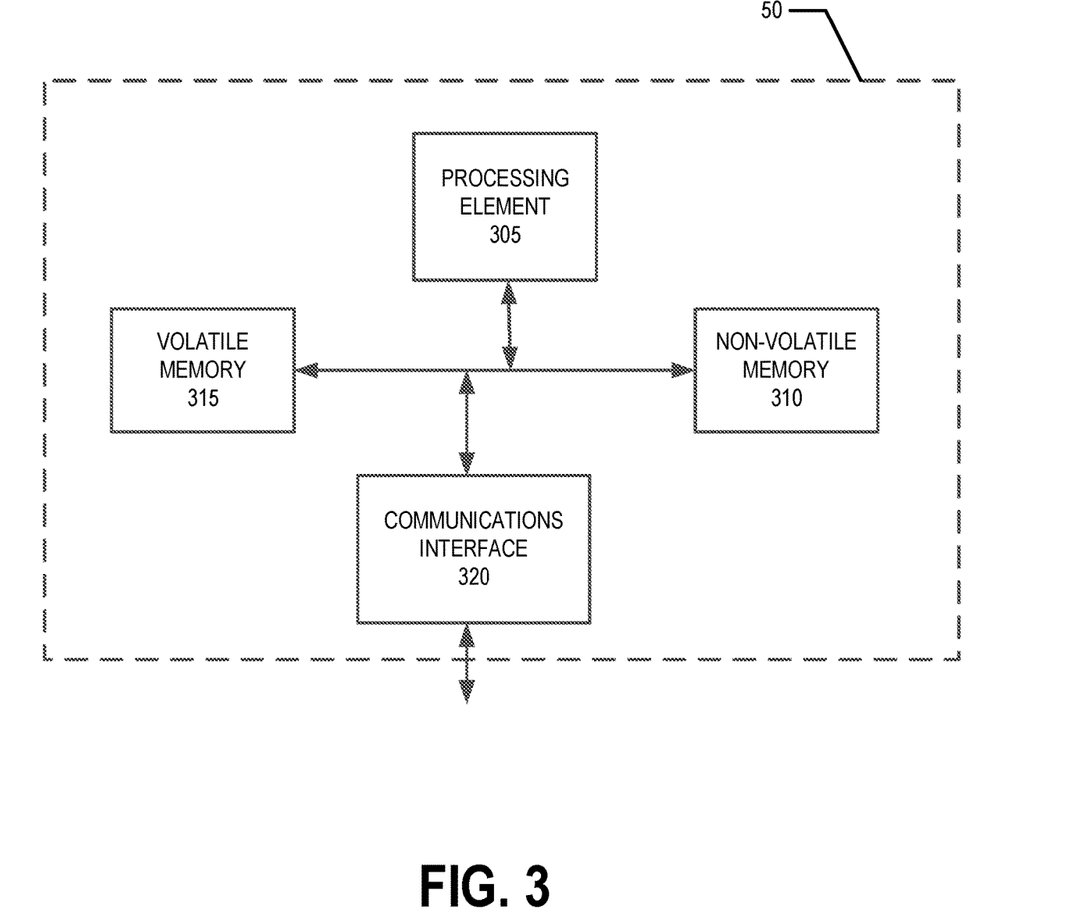
FIG. 3 is an exemplary schematic diagram of a remote computing entity, according to an example embodiment of the present invention.

FIG. 3 provides a schematic of a remote computing entity 50 according to one embodiment of the present invention. In various embodiments, a remote computing entity 50 is remote from the vehicle 5 and/or mobile computing entity 110 in that the remote computing entity 50 is not onboard vehicle 5. For example, the remote computing entity 50 may be part of a cloud-based computing network, infrastructure, and/or the like, in an example embodiment. In general, the terms computing entity, entity, device, system, and/or similar words used herein interchangeably may refer to, for example, one or more computers, computing entities, desktop computers, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the remote computing entity 50 may also include one or more communications interfaces 320 for communicating with various computing entities, such as by communicating data, content, information, and/or similar terms used herein interchangeably that can be transmitted, received, operated on, processed, displayed, stored, and/or the like. For instance, the remote computing entity 50 may communicate with vehicles 5 (e.g., vehicle control/collection devices 60), mobile computing entities 110, and/or the like.

As shown in FIG. 3, in one embodiment, the remote computing entity 50 may include or be in communication with one or more processing elements 305 (also referred to as processors, processing circuitry, and/or similar terms used herein interchangeably) that communicate with other elements within the remote computing entity 50 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the remote computing entity 50 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the remote computing entity 50 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the remote computing entity 50 with the assistance of the processing element 305 and operating system.

As indicated, in one embodiment, the remote computing entity 50 may also include one or more communications interfaces 320 for communicating with various computing entities, such as by communicating data, content, information, and/or similar terms used herein interchangeably that can be transmitted, received, operated on, processed, displayed, stored, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the remote computing entity 50 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the remote computing entity 50 may include or be in communication with one or more input elements, such as a keyboard input, a mouse input, a touch screen/display input, audio input, pointing device input, joystick input, keypad input, and/or the like. The remote computing entity 50 may also include or be in communication with one or more output elements (not shown), such as audio output, video output, screen/display output, motion output, movement output, and/or the like.

As will be appreciated, one or more of the remote computing entity's 50 components may be located remotely from other remote computing entity 50 components, such as in a distributed system. Furthermore, one or more of the components may be combined and additional components performing functions described herein may be included in the remote computing entity 50. Thus, the remote computing entity 50 can be adapted to accommodate a variety of needs and circumstances.

3. Exemplary Mobile Computing Entity

Figure 4:
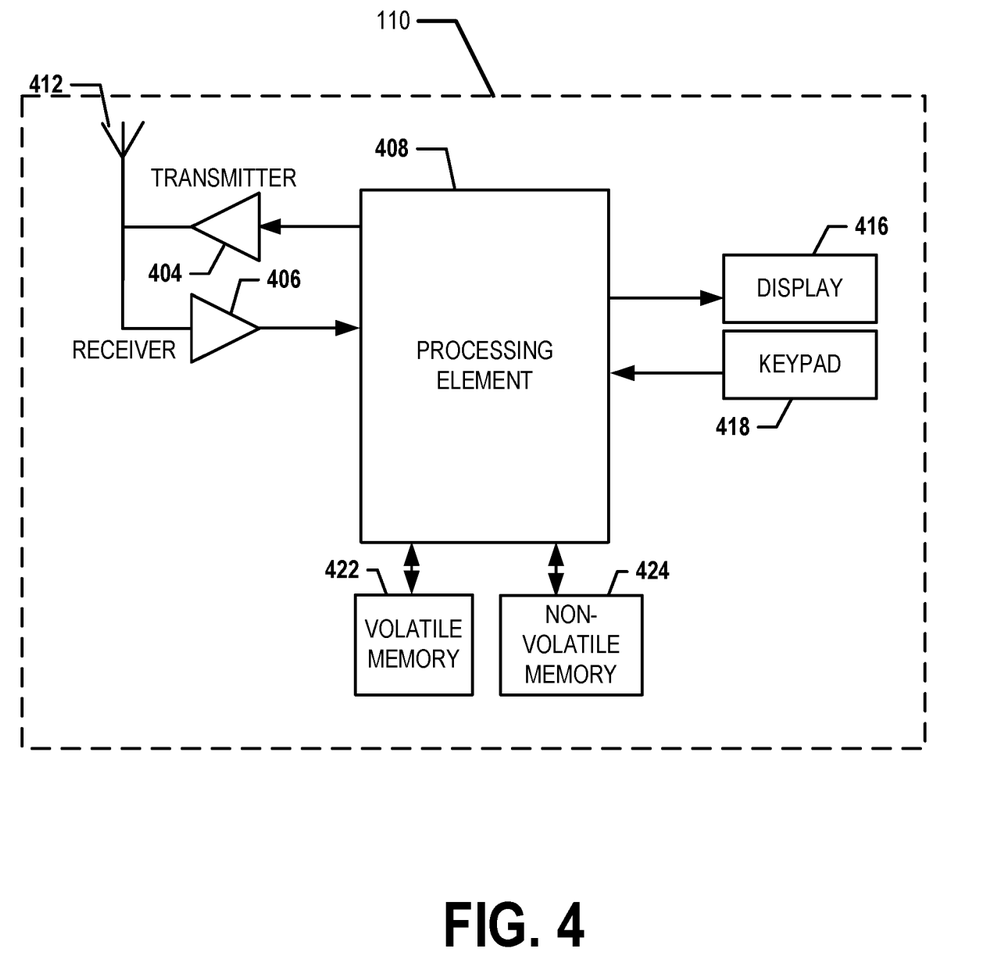
FIG. 4 is an exemplary schematic diagram of a mobile computing entity, according to an example embodiment of the present invention.

FIG. 4 provides an illustrative schematic representative of a mobile computing entity 110 that can be used in conjunction with embodiments of the present invention. In one embodiment, the mobile computing entities 110 may include one or more components that are functionally similar to those of the remote computing entity 50 and/or as described below. As will be recognized, mobile computing entities 110 can be operated by various parties, including operators of vehicles 5. As shown in FIG. 4, a mobile computing entity 110 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as vehicles 5, remote computing entities 50, and/or the like. In this regard, the mobile computing entity 110 may be capable of operating with one or more air interface standards, communication protocols, modulation types, and access types. More particularly, the mobile computing entity 110 may operate in accordance with any of a number of wireless communication standards and protocols. In a particular embodiment, the mobile computing entity 110 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. For example, the mobile computing entity 110 is configured to interface with the vehicle control/collection device 60 via a communication port 230 thereof.

Via these communication standards and protocols, the mobile computing entity 110 can communicate with various other entities using concepts such as Unstructured Supplementary Service information/data (US SD), Short Message Service (SMS), Multimedia Messaging Service (MMS), Dual-Tone Multi-Frequency Signaling (DTMF), and/or Subscriber Identity Module Dialer (SIM dialer). The mobile computing entity 110 can also download changes, add-ons, and updates, for instance, to its firmware, software (e.g., including executable instructions, applications, program modules), and operating system.

According to one embodiment, the mobile computing entity 110 may include location determining aspects, devices, modules, functionalities, and/or similar words used herein interchangeably. For example, the mobile computing entity 110 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the mobile computing entity's 110 position in connection with a variety of other systems, including cellular towers, Wi-Fi access points, and/or the like. Similarly, the mobile computing entity 110 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The mobile computing entity 110 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 110 to interact with and/or cause display of information. The user input interface can comprise any of a number of devices allowing the mobile computing entity 110 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the mobile computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the telematics data.

The mobile computing entity 110 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile computing entity 110.

4. Exemplary Visual Sensor

In various embodiments, visual sensors 130, such as video cameras, still cameras, and/or the like may be configured to record/capture movement (e.g., blinking, yawning, eye movement, etc.), body position, and/or the like of an operator of the vehicle 5. These visual sensors (e.g., visual sensors 130) may be configured to continuously record/capture visual images (e.g., via a 30 frames per second information/data recordation frequency, although other frame rates may be utilized) of the operator. The visual sensors 130 may have associated motion sensors that may be utilized to generate trigger signals to initiate information/data recordation in embodiments without continuous recording/capturing.

Moreover, in certain embodiments, the visual sensors 130 may include one or more components that are functionally similar to those of the mobile computing entity 110, vehicle control/collection device 60, remote computing entity 50, and/or the like. For example, in one embodiment, each visual sensor 130 may include one or more processing elements (e.g., CPLDs, microprocessors, multi-core processors, co-processing entities, ASIPs, microcontrollers, and/or controllers), volatile and non-volatile storage or memory, one or more communications interfaces, and/or one or more user interfaces.

5. Exemplary Wearable Sensor

Moreover, various embodiments comprise one or more additional sensing devices (e.g., wearable sensor(s) 102) configured to capture biometric information/data corresponding to the operator. For example, the wearable sensors 102 may comprise one or more sensors configured to record/capture brain electrical activity such as alpha and/or theta electrical brain activity. For example, the wearable sensors 102 may comprise one or more sensors configured to be worn about and/or on the operator's head. For example, the wearable sensors 102 may comprise a BCI configured to be placed on and/or about the head of the operator and that is configured to attain information/data through EEG. An example of such a wearable sensor 102 that may be used in an example embodiment is the Emotiv® Insight 5 Channel EEG Headset. The Emotiv® Insight 5 Channel EEG Headset is only an example and a feasible device may have more or less channels. Additionally, other similar EEG devices may be used to attain the operator's electrical brain activity such as an EEG cap, Emotiv® EPOC, MUSE® and/or any other device capable of extracting the alpha and theta brain waves of the operator. In various embodiments, the wearable sensor 102 may be configured to capture sensor information/data corresponding to the operator's blood pressure, heart rate, pulse, oxygen saturation levels, and/or other biometric information/data. In an example embodiment, the wearable sensors 102 may include a wearable sensor worn around the operator's wrist and configured to capture various types of biometric information/data corresponding to the operator. For example, the wearable sensors 102 may include a Fitbit®-like sensor device. For example, the wearable sensors 102 may include a device configured to be worn by a person (e.g., an operator) and comprising one or more sensors configured to capture sensor information/data corresponding to biometric information/data of the wearer.

In certain embodiments, various wearable sensors 102 may be wearable by the operator. The wearable sensors 102 may thus comprise one or more bands, straps, adhesives, and/or other securing features such that the wearable sensor 102 may be secured onto the operator in a manner that the wearable sensor 102 does not negatively affect the operator's ability to operate the vehicle. Moreover, the wearable sensors 102 may each include one or more components that are functionally similar to those of the vehicle control/collection device 60, mobile computing entity 110, remote computing entity 50, and/or the like. For example, in one embodiment, each wearable sensors 102 may include one or more processing elements (e.g., CPLDs, microprocessors, multi-core processors, co-processing entities, ASIPs, microcontrollers, and/or controllers), volatile and non-volatile storage or memory, one or more communications interfaces, and/or one or more user interfaces.

III. EXEMPLARY SYSTEM OPERATION

According to various embodiments, a mobile computing entity 110, which may be part of or in communication with an onboard system 100 onboard a vehicle 5, monitors an alertness level for an operator of the vehicle 5. The alertness level for the operator is determined based at least in part on operator behavior information/data and biometric information/data captured and/or determined based at least in part on the analysis of sensor information/data captured by one or more wearable sensors 102, one or more visual sensors 130, and/or one or more vehicle sensors (telematics sensors 125). When the alertness level for the operator satisfies a first treatment threshold requirement (e.g., drops below a treatment threshold value), the mobile computing entity 110 may be configured to initiate moderate treatment, such as initiating an operator engagement interaction with the operator of the vehicle 5. When the alertness level increases (due to operator engagement via the operator engagement interaction) such that the alertness level for the operator no longer satisfies the first treatment threshold requirement, for example, the operator engagement interaction may be ceased. When the alertness level does not increase or continues to decrease (e.g., such that a second treatment threshold requirement is satisfied), additional actions may be taken by the mobile computing entity 110. For example, the mobile computing entity 110 may provide a notification to one or more contacts (e.g., send a message, initiate a phone call, and/or the like), suggest that the operator stop and rest, provide directions and/or instructions to a place where the operator can stop and rest, and/or the like. In an example embodiment, the mobile computing entity 110 is configured to cause an automated shutdown of the vehicle 5 in various scenarios (e.g., when the operator is non-responsive). In various embodiments, the mobile computing entity 110 monitors the operator's awareness level using a model trained using machine learning. In an example embodiment, the model is trained for a particular operator (e.g., personalized to the particular operator's behavior and/or biometrics). In various embodiments, the mobile computing entity 110 may use one or more cloud-based resources for monitoring the operator's awareness level (e.g., the model may be executed in a cloud-based environment via one or more remote computing entities 50 in communication with the mobile computing entity 110 via network 40).

Figure 5:
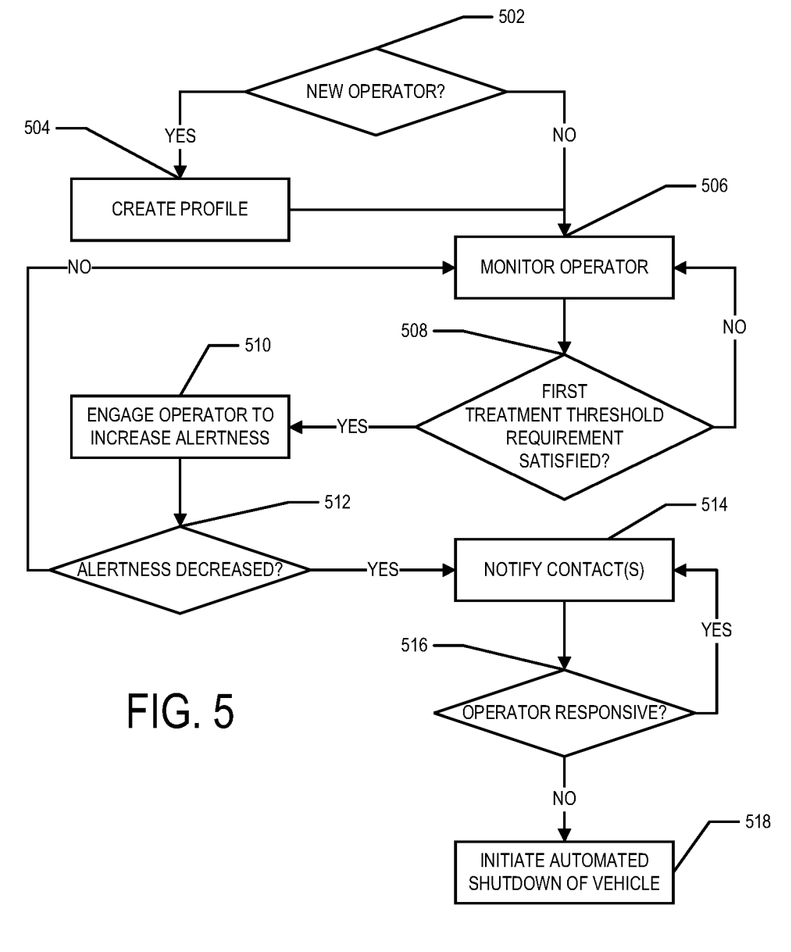
FIG. 5 provides a flowchart illustrating example processes, procedures, and/or operations for providing a predicted a future value of a time series, according to an example embodiment of the present invention.

FIG. 5 provides a flowchart illustrating example processes, procedures, operations, and/or the like for improving the alertness of a vehicle operator. Starting at step/operation 502, when an operator begins operation of the vehicle 5, it is determined if the operator is a new operator. For example, the mobile computing entity 110 may determine if the operator is a new operator. For example, the operator may be asked to authenticate (e.g., log in) via the mobile computing entity 110 and it may be determined if an operator profile corresponding to the operator exists (e.g., in an operator profile database stored by the mobile computing entity 110 and/or a remote computing entity 50). In an example embodiment, a physical or digital key (e.g., vehicle activation code and/or the like) use to activate the vehicle, an radio frequency identification (RFID) card carried by the operator, one or more biometric security measures (e.g., face scan, retinal scan, fingerprint scan, voice scan, and/or the like) may be used to identify the operator of the vehicle. Once the operator is identified, it may be determined whether an operator profile corresponding to the operator exists (e.g., by querying the operator profile database).

When, at step/operation 502, it is determined that the operator is a new operator (e.g., an operator profile corresponding to the operator does not exist), the process continues to step/operation 504 and an operator profile is generated for the operator. For example, the mobile computing entity 110 and/or remote computing entity 50 may generate an operator profile for the operator and cause the operator profile to be stored in the operator profile database. For example, the mobile computing entity 110 and/or remote computing entity 50 may access one or more files corresponding to the operator (e.g., employment files, contacts, and/or the like) to identify various elements of information/data for the operator profile. For example, the operator's supervisor and/or any rules and/or regulations corresponding to the operator's operation of the vehicle may be identified based at least in part on the accessed one or more files. In various embodiments, the operator may (e.g., via interaction with the user interface of the mobile computing entity 110) provide various information/data for the corresponding operator profile. For example, the operator may provide contact information/data (e.g., phone numbers, names, and/or the like) for one or more individuals (e.g., family members, friends, and/or the like) that the operator may want to contact (e.g., have a phone call with) to help the operator maintain their alertness while operating the vehicle. The operator may provide information/data regarding preferred radio stations and/or music genres for use in control of a radio onboard the vehicle 5, and/or various other information/data corresponding to the operator.

As the operator operates the vehicle 5, the alertness of the operator is monitored, at step/operation 506. For example, the operator may wear one or more wearable sensors 102 (e.g., a headband sensor configured to capture at least EEG information/data corresponding to the operator, a wristband sensor configured to capture various biometric information/data corresponding to the operator, and/or the like). The one or more wearable sensors 102 may capture biometric information/data (e.g., EEG information/data indicating alpha and/or theta electrical brain activity, blood pressure, heart rate, pulse, oxygen saturation levels, and/or the like) and provide the biometric information/data to the mobile computing entity 110. In another example, the visual sensor(s) 130 may capture visual information/data which may be analyzed (e.g., by the visual sensor 130, mobile computing entity 110, and/or remote computing entity 50) to determine behavior information/data for the operator. For example, the visual sensor 130 may be oriented within the vehicle such that when the operator is in a position to operate the vehicle, the operator's face and/or body is at least partially within the field of view of the visual sensor 130. The visual information/data may be analyzed to determine the frequency and length of blinking by the operator, the frequency of yawning by the operator, body posture of the operator, and/or the like. In another example, vehicle sensors onboard the vehicle may capture vehicle sensor information/data corresponding to the operator's behavior (e.g., speed, acceleration, hardness of braking, sharpness of turning, lane management, and/or the like). The vehicle sensors may provide the vehicle sensor information/data to the vehicle control/collection device 60 which may provide the vehicle sensor information/data (and/or results of analyzing the vehicle sensor information/data) to the mobile computing entity 110.

The mobile computing entity 110 may determine an alertness level for the operator of the vehicle based at least in part on the biometric information/data and the behavior information/data (e.g., the visual information/data and/or the results of analysis thereof and the vehicle sensor information/data and/or the results of analysis thereof). For example, the mobile computing entity 110 may execute a model (and/or cause a remote computing entity 50 to execute a model) to determine an alertness level for the operator based at least in part on the biometric information/data and the behavior information/data (e.g., the visual information/data and/or the results of analysis thereof and the vehicle sensor information/data and/or the results of analysis thereof). In various embodiments, the model may be a model trained using machine learning techniques. In an example embodiment, the model is trained for a particular operator. For example, various individuals' behaviors and/or biometric information/data (e.g., EEG information/data) may differ even at the same level of alertness and/or drowsiness. For example, two individuals experiencing the same level of alertness and/or drowsiness may have different levels of alpha and/or theta electrical brain activity. Thus, the model may be trained for a particular operator.

At step/operation 508, it is determined if the first treatment threshold requirement is satisfied. For example, the mobile computing entity 110 may determine if the alertness level of the operator satisfies the first treatment threshold requirement. For example, if the alertness level of the operator is below a first treatment threshold, the first treatment threshold requirement is satisfied, in an example embodiment. In an example embodiment, an alertness level determined for the operator (e.g., based at least in part on the model) may be compared to a first treatment threshold to determine if the alertness level of the operator is low enough that an operator engagement interaction should be initiated.

When, at step/operation 508, it is determined that the first treatment threshold requirement is not satisfied, the process returns to step/operation 506 and the alertness level of the operator continues to be monitored.

When, at step/operation 508, it is determined that the first treatment threshold requirement is satisfied, an operator engagement interaction is initiated (step/operation 510). For example, the mobile computing entity 110 may initiate an operator engagement interaction. In various embodiments, the operator engagement interaction is configured to increase the alertness level of the operator. In various embodiments, the operator engagement interaction is a voice-based interaction between the mobile computing entity 110 and the operator. For example, the operator engagement interaction may include the mobile computing entity 110 verbally (e.g., via one or more speakers of the vehicle 5 and/or the mobile computing entity 110) asking the operator questions and the operator verbally responding to the questions (e.g., such that a microphone of the vehicle 5 and/or mobile computing entity 110 receives the operator's responses). In an example embodiment, the questions are elementary level arithmetic problems. For example, the questions may be third grade level addition and/or subtraction problems. For example, the operator may be asked for the sum of adding two single digit numbers and/or the difference between two single digit numbers.

In an example embodiment, when the alertness level of the operator is found to satisfy the first treatment threshold level, it is suggested to the operator (e.g., via the mobile computing entity 110) that the operator stop and rest and/or instructions and/or directions may be provided to the operator (e.g., via the mobile computing entity 110) to a nearby location where the operator may stop and rest. In an example embodiment, the operator engagement interaction may be configured to continue until the operator reaches the nearby location (e.g., five minutes, ten minutes, fifteen minutes, twenty minutes, and/or the like). In an example embodiment, when the alertness level of the operator is found to satisfy the first treatment threshold level, it is suggested to the operator (e.g., via the mobile computing entity 110) that the vehicle 5 be operated in autopilot mode (e.g., automated operation of the vehicle 5 via the vehicle control/collection device 60) for a period of time so that the operator may rest and/or instructions and/or directions may be provided to the operator (e.g., via the mobile computing entity 110) that, when completed by the operator, are expected to place the vehicle 5 in a position or location where autopilot mode may be activated such that the operator may rest. For example, the operator may be instructed to move an aircraft to a particular altitude or to operate a car with self-driving capabilities away from a busy urban center such that the vehicle may be operated in autopilot mode while the operator rests for a period of time. In an example embodiment, the operator engagement interaction may be configured to continue until the operator reaches the position or location where the vehicle may be operated in autopilot mode (e.g., five minutes, ten minutes, fifteen minutes, twenty minutes, and/or the like).

In various embodiments, the mobile computing entity 110 continues to monitor the alertness level of the operator during the operator engagement interaction. After a predetermined number of questions, after a predetermined amount of time, and/or the like, the alertness level of the operator is assessed to determine if the alertness level of the operator has improved, deteriorated, or has been maintained, at step/operation 512. For example, the mobile computing entity 110 may determine the alertness level of the operator once the operator has been participating in the operator engagement interaction for a predetermined number of questions, after a predetermined amount of time, and/or the like. In various embodiments, the alertness level of the operator may be determined via similar processes as described above with respect to step/operation 506. For example, biometric and/or behavior information/data corresponding to the operator may be analyzed (e.g., via a machine learning trained model) to determine an alertness level for the operator.

In an example embodiment, each time the operator answers a question correctly, an incorrect response counter is reset to zero. When the operator provides an incorrect response, the incorrect response counter is iterated by one. In response to the incorrect response counter reaching a first threshold count (e.g., two incorrect responses), the mobile computing entity 110 may prompt the operator with the option of pulling over to take a break or proceeding with the next arithmetic question. In response to the incorrect response counter reaching a second threshold count (e.g., three incorrect responses), the operator may be asked whether they would like different questions. When the mobile entity 110 determines that a response to the question of whether the operator would like different questions has not been received, a response to the question of whether the operator would like different questions is negative (e.g., no the operator would not like different questions), or the incorrect response counter increases further, an emergency sequence may be started. For example, the mobile computing entity 110 may determine, at step/operation 512, that the operator's alertness level has decreased.

When, at step/operation 512, it is determined that the operator's alertness level has improved such that the first treatment threshold requirement is no longer satisfied, the operator engagement interaction may be suspended and the operator's alertness level may continue to be monitored (e.g., by the mobile computing entity 110). When, at step/operation 512, it is determined that the operator's alertness level has improved, but not sufficiently such that the first treatment threshold requirement is no longer satisfied, the operator's alertness level has been maintained (e.g., has neither significantly increased nor decreased), the operator engagement interaction is continued. For example, the mobile computing entity 110 may continue the operator engagement interaction. When at step/operation 512, it is determined that the operator's alertness level has decreased, the process continues to step/operation 514. For example, it may be determined (e.g., by the mobile computing entity 110 at step/operation 512) that the operator's alertness level satisfies a second treatment threshold requirement and may initiate a second level of treatment. For example, when it is determined that the operator's alertness level is below a second treatment threshold, it may be determined that the second treatment threshold requirement is satisfied and a second level of treatment may be initiated. In various embodiments, the second level of treatment may include notifying one or more contacts of the operator's alertness level, suggesting the operator take a break from operating the vehicle to rest, provide instructions and/or directions to a place where the operator may take a break from operating the vehicle to rest, and/or the like.

In various embodiments, notifying one or more contacts may be performed based at least in part on information/data stored in the operator profile corresponding to the operator. For example, a notification may be provided to an electronic address (e.g., phone number, email address, instant message handle, social media handle, and/or the like) corresponding to one or more contacts, as indicated by the corresponding operator profile. For example, the operator's supervisor and/or a safety reporting department may be notified via automated phone call, automated voicemail, short message service (SMS) or multimedia message service (MMS) message, email, instant message, and/or the like. In various embodiments, the notification may include the operator's name and/or another operator identifier, a timestamp indicating the date and/or time at which the notification was generated/provided, an indication of the operator's alertness level, and/or the like. In an example embodiment, a notification may be provided to a local emergency services department (e.g., 911, local police department, and/or the like) based at least in part on the location of the vehicle 5. For example, the location of the mobile computing entity 110 may be determined (e.g., based at least in part on a location sensor thereof and/or a location sensor/GNSS sensor associated with the vehicle control/collection device 60) and a local emergency services department may be identified based thereon. In an example embodiment, providing a notification to one or more contacts may include initiating a phone call between the mobile computing entity 110 and a phone number provided by the operator (as part of the operator profile) such that the operator may have a (hands-free) telephone conversation with an operator-selected friend or family member or other individual.

In various embodiments, the second level of treatment may include identifying one or more places near the operator's location where the operator may stop and rest. In an example embodiment, the second level of treatment may determine if the vehicle may be able to operate on auto pilot for at least a short time so that the operator may rest. As should be understood, the parameters of where the operator may stop and rest and/or use an autopilot function of the vehicle 5 (e.g., provided via the vehicle control/collection device 60) is dependent on the vehicle 5 being operated. In various embodiments, the alertness level of the operator continues to be monitored during the second level of treatment.

At step/operation 516, it may be determined if the operator is non-responsive and/or incoherent. For example, the mobile computing entity 110 may be configured to determine if the operator is non-responsive and/or incoherent. For example, throughout the monitoring of the alertness level of the operator, it may be determined whether the operator is response and coherent. If it is determined that the operator is non-responsive and/or incoherent, it may be determined that the operator is asleep and/or experiencing a medical emergency and the process may continue to step/operation 518. At step/operation 518, the mobile computing entity 110 may cause the vehicle control/collection device 60 to initiate an automated shutdown of the vehicle 5. For example, the mobile computing entity 110 may cause the vehicle control/collection device 60 to park the vehicle 5 on the side of the road (e.g., in the shoulder) and turn off the vehicle. In another example, the mobile computing entity 110 may cause the vehicle control/collection device 60 to park the vehicle 5 in the nearest parking lot. In an example embodiment, the mobile computing entity 110 may notify a local emergency services department (e.g., 911, local police department, emergency medical service provider, and/or the like) based at least in part on the location of the vehicle 5.

6. Advantages

Various embodiments of the present invention provide significant technical advantages and address technical challenges of addressing issues with non-alert and/or drowsy operators of vehicles. For example, various embodiments are configured to identify when the alertness level of an operator is beginning to be low. For example, various embodiments are configured to increase the alertness level of the operator. For example, various embodiments provide an improvement by not merely identifying when an operator is experiencing a low level of alertness, but by providing an operator engagement interaction that is configured to increase the alertness of the operator. In particular, the operator engagement interaction may include asking the operator to answer elementary arithmetic problems, which has been found to actually increase the alertness of an operator. In various embodiments, when the alertness level of the operator is not increased, further operations may be performed to aid the operator in ceasing and/or pausing in operating the vehicle such that the operator may rest. The alertness level of the operator may be determined based at least in part on a model trained using machine learning techniques. In various embodiments, the model is specific to a particular operator. For example, various operators may exhibit different behaviors and/or biometrics (e.g., different levels of alpha and/or theta electrical brain activity) at the same alertness level. Thus, various embodiments provide a technical improvement by providing individualized models for determining the alertness level of a particular operator. As such, various embodiments provide an improvement to the art.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation

The invention claimed is:

1. A method for monitoring alertness of an operator of a vehicle, the method comprising:
receiving, by a processor, biometric data and behavior data for the operator, the biometric data and the behavior data captured by at least one of a wearable sensor, a visual sensor, or a vehicle sensor onboard the vehicle;
determining, by the processor, an alertness level of the operator based at least in part on the biometric data and the behavior data using a model that is personalized for the operator;
responsive to determining that the alertness level of the operator satisfies a first treatment level threshold, performing, by the processor, an operator engagement interaction to increase the alertness level of the operator, wherein performing the operator engagement interaction comprises:
causing an elementary level arithmetic question to be audibly provided to the operator,
receiving an audible response originating from the operator corresponding to the elementary level arithmetic question,
in response to determining that the audible response included a correct answer to the elementary level arithmetic question, resetting, by the processor, an incorrect answer counter,
in response to determining that the audible response included an incorrect answer to the elementary level arithmetic question, iterating the incorrect answer counter,
in response to determining that the incorrect answer counter has reached a first threshold count, causing a suggestion that the operator pull over to be audibly provided to the operator, and
in response to determining that the incorrect answer counter has reached a second threshold count, determining that the alertness level of the operator satisfies a second treatment level threshold; and
responsive to determining that the alertness level of the operator satisfies the second treatment level threshold:
determining a current location of the vehicle;
identifying a break location based at least in part on the current location of the vehicle, the break location being a location where the vehicle is operable in an automated operation mode while the operator is able to take a break from operating the vehicle; and
causing route guidance to the break location to be provided.

2. The method of claim 1, wherein the model is trained using a machine learning technique.

3. The method of claim 1, wherein the operator engagement interaction is a voice-based interaction between a mobile computing entity and the operator.

4. The method of claim 3, wherein the mobile computing entity comprises and/or is in communication with a speaker and a microphone.

5. The method of claim 1, wherein the elementary level arithmetic question is addition and/or subtraction problems of two single digit numbers.

6. The method of claim 1, wherein the biometric data comprises EEG data.

7. The method of claim 1, further comprising:
determining whether the alertness level of the operator has improved as a result of the operator engagement interaction; and
responsive to determining that the alertness level of the operator has improved as a result of the operator engagement interaction, ceasing the operator engagement interaction.

8. The method of claim 1, further comprising, responsive to determining that the alertness level of the operator satisfies the second treatment level threshold:
identifying one or more contacts and corresponding contact data based at least in part on an operator profile corresponding to the operator, and
notifying the one or more contacts.

9. The method of claim 8, wherein notifying the one or more contacts comprises providing a notification to an electronic address corresponding to the one or more contacts.

10. The method of claim 1, further comprising, responsive to determining that the alertness level of the operator satisfies the second treatment level threshold:
identifying a local emergency services department based at least in part on the current location; and
notifying the local emergency services department.

11. The method of claim 8, wherein notifying the one or more contacts comprises initiating a phone call with a contact.

12. The method of claim 1, further comprising:
after initiation of the operator engagement interaction, re-determining the alertness level of the operator; and
responsive to determining that the alertness level of the operator satisfies a second treatment level threshold, providing the operator with instructions for ceasing and/or pausing the operator's operation of the vehicle.

13. The method of claim 1, further comprising:
determining whether the operator is responsive and coherent; and
responsive to determining that the operator is not responsive and/or not coherent,
initiating an automated shut down of the vehicle.

14. A mobile computing entity comprising at least one processor, a communications interface configured for communicating via at least one network, and at least one memory storing computer program code, the mobile computing entity being onboard a vehicle comprising one or more vehicle sensors, the at least one memory and the computer program code configured to, with the at least one processor, cause the mobile computing entity to at least:
receive biometric data and behavior data for an operator of the vehicle, the biometric data and the behavior data captured by at least one of a wearable sensor, a visual sensor, or a vehicle sensor of the one or more vehicle sensors;
determine an alertness level of the operator based at least in part on the biometric data and the behavior data using a model that is personalized for the operator;
responsive to determining that the alertness level of the operator satisfies a first treatment level threshold, perform an operator engagement interaction to increase the alertness level of the operator, wherein performing the operator engagement interaction comprises:
causing an elementary level arithmetic question to be audibly provided to the operator,
receiving an audible response originating from the operator corresponding to the elementary level arithmetic question,
in response to determining that the audible response included a correct answer to the elementary level arithmetic question, resetting, by the processor an incorrect answer counter, in response to determining that the audible response included an incorrect answer to the elementary level arithmetic question, iterating the incorrect answer counter, in response to determining that the incorrect answer counter has reached a first threshold count, causing a suggestion that the operator pull over to be audibly provided to the operator, and in response to determining that the incorrect answer counter has reached a second threshold count, determining that the alertness level of the operator satisfies a second treatment level threshold; and responsive to determining that the alertness level of the operator satisfies the second treatment level threshold:
determine a current location of the vehicle;
identify a break location based at least in part on the current location of the vehicle, the break location being a location where the vehicle is operable in an automated operation mode while the operator is able to take a break from operating the vehicle; and
cause route guidance to the break location to be provided.

15. The mobile computing entity of claim 14, wherein the at least one memory and the computer program code are further configured to, with the at least one processor, cause the mobile computing entity to at least:
after initiation of the operator engagement interaction, re-determine the alertness level of the operator; and
responsive to determining that the alertness level of the operator satisfies a second treatment level threshold, perform at least one of (a) notifying one or more contacts, the one or more contacts and corresponding contact data identified based at least in part on an operator profile corresponding to the operator or (b) providing the operator with instructions for ceasing and/or pausing the operator's operation of the vehicle.

16. The mobile computing entity of claim 14, wherein the mobile computing entity comprises and/or is in communication with a speaker and a microphone, the operator engagement interaction is a voice-based interaction between the mobile computing entity and the operator, and the operator engagement interaction comprises the operator verbally responding to the elementary level arithmetic question.

17. A computer program product comprising at least one non-transitory computer-readable storage medium having computer-readable program code portions stored therein, the computer-readable program code portions comprising executable portions configured, when executed by a processor of an apparatus, to cause the apparatus to
receive biometric data and behavior data for an operator of a vehicle, the biometric data and the behavior data captured by at least one of a wearable sensor, a visual sensor, or a vehicle sensor onboard the vehicle;

determine an alertness level of the operator based at least in part on the biometric data and the behavior data using a model that is personalized for the operator;

responsive to determining that the alertness level of the operator satisfies a first treatment level threshold, perform an operator engagement interaction to increase the alertness level of the operator, wherein performing the operator engagement interaction comprises:

causing an elementary level arithmetic question to be audibly provided to the operator, receiving an audible response originating from the operator corresponding to the elementary level arithmetic question, in response to determining that the audible response included a correct answer to the elementary level arithmetic question, resetting, by the processor an incorrect answer counter, in response to determining that the audible response included an incorrect answer to the elementary level arithmetic question, iterating the incorrect answer counter, in response to determining that the incorrect answer counter has reached a first threshold count, causing a suggestion that the operator pull over to be audibly provided to the operator, and in response to determining that the incorrect answer counter has reached a second threshold count, determining that the alertness level of the operator satisfies a second treatment level threshold; and responsive to determining that the alertness level of the operator satisfies the second treatment level threshold:
determine a current location of the vehicle;
identify a break location based at least in part on the current location of the vehicle, the break location being a location where the vehicle is operable in an automated operation mode while the operator is able to take a break from operating the vehicle; and
cause route guidance to the break location to be provided.

18. The method of claim 1,
further comprising, responsive to determining that the vehicle is located at the location where the vehicle is operable in the automated operation mode, causing the vehicle to be operated in the automated operation mode.

19. The method of claim 18, wherein operating the vehicle in the automated operation mode includes moving the vehicle from a travel lane of a road network and parking the vehicle.

20. The method of claim 1, further comprising continuing to perform the operator engagement interaction as the operator operates the vehicle to the break location.

* * * * *